United States Patent [19]
Williams

[11] Patent Number: 6,056,666
[45] Date of Patent: May 2, 2000

[54] SYNCHRONIZED RANGE SHIFT MECHANISM FOR TRANSFER CASE

[75] Inventor: Randolph C. Williams, Weedsport, N.Y.

[73] Assignee: New Venture Gear, Inc., Troy, Mich.

[21] Appl. No.: 09/124,289

[22] Filed: Jul. 28, 1998

[51] Int. Cl.[7] .................................................. F16H 3/54
[52] U.S. Cl. .................... 475/320; 475/295; 475/303; 180/247
[58] Field of Search .................... 475/295, 303, 475/317, 320; 180/247

[56] References Cited

U.S. PATENT DOCUMENTS

| | | | |
|---|---|---|---|
| 4,063,470 | 12/1977 | Kelbel | 475/320 |
| 4,569,252 | 2/1986 | Harper | 475/303 |
| 4,770,280 | 9/1988 | Frost . | |
| 4,838,121 | 6/1989 | Takeshita et al. | 475/303 |
| 4,920,828 | 5/1990 | Kameda et al. | 475/320 X |
| 5,054,335 | 10/1991 | Andrews | 74/665 GA |
| 5,105,902 | 4/1992 | Wilson et al. | 182/247 |
| 5,284,068 | 2/1994 | Frost | 74/665 GA |
| 5,346,442 | 9/1994 | Eastman | 475/223 |
| 5,651,749 | 7/1997 | Wilson et al. | 475/221 |
| 5,655,986 | 8/1997 | Wilson et al. | 475/204 |
| 5,697,861 | 12/1997 | Wilson | 475/198 |
| 5,700,222 | 12/1997 | Bowen | 475/204 |
| 5,702,321 | 12/1997 | Bakowski et al. | 475/199 |
| 5,704,867 | 1/1998 | Bowen | 475/221 |

FOREIGN PATENT DOCUMENTS 9010806  9/1990  WIPO .

*Primary Examiner*—Sherry L. Estremsky
*Attorney, Agent, or Firm*—Harness, Dickey & Pierce, P.L.C.

[57] ABSTRACT

A transfer case for a four-wheel drive vehicle having a planetary gear assembly and a synchronized range clutch which can be selectively shifted on-the-move establishing high-range and low-range drive modes. The planetary gear assembly includes a ring gear, a sun gear, a carrier coupled for rotation with an output shaft of the transfer case, and a pinion gear rotatably supported from the carrier and which is meshed with the ring gear and the sun gear. The range clutch includes a first sleeve coupled for rotation with the ring gear and which is rotatably supported from a second sleeve coupled for rotation with an input shaft of the transfer case. With the range clutch in a first position, the first sleeve is uncoupled from the housing and the second sleeve is coupled to the carrier for driving the output shaft at a first speed ratio relative to the input shaft. With the range clutch in a second position, the first sleeve is coupled to the housing and the second sleeve is coupled to the sun gear for driving the output shaft at a second speed ratio relative to the input shaft.

27 Claims, 6 Drawing Sheets

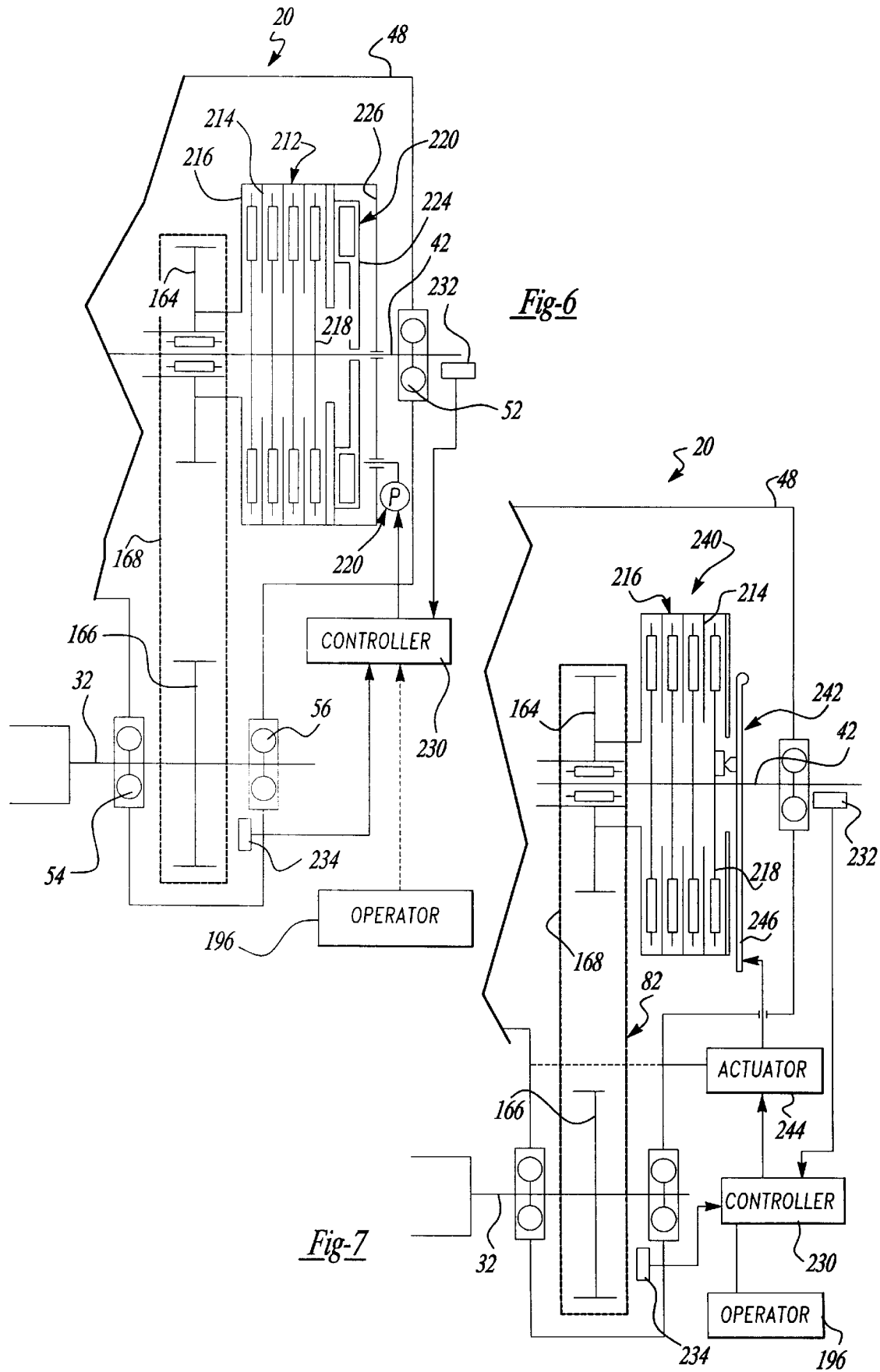

ent invention relates generally to transfer cases
for use in four-wheel drive vehicles. More particularly, the
present invention relates to a transfer case having a syn-
chronized range shift mechanism for on-the-fly shifting
between high-range and low-range drive modes.

SYNCHRONIZED RANGE SHIFT MECHANISM FOR TRANSFER CASE

BACKGROUND OF THE INVENTION

The present invention relates generally to transfer cases for use in four-wheel drive vehicles. More particularly, the present invention relates to a transfer case having a synchronized range shift mechanism for on-the-fly shifting between high-range and low-range drive modes.

As is now conventional, many light-duty and sport-utility vehicles are equipped with a transfer case for transmitting drive torque to all four of the wheels, thereby establishing a four-wheel drive mode of operation. To accommodate differing road surfaces and conditions, many transfer cases are equipped with a gear reduction unit which can be selectively shifted by the vehicle operator to establish four-wheel high-range and low-range drive modes. In many instances, the vehicle must be stopped before the transfer case can be shifted between its four-wheel high-range and low-range drive modes. Unfortunately, the need to stop the vehicle prior to such range shifting is inconvenient, particularly upon encountering road conditions or surface terrains where continuation of the vehicle's rolling momentum would assist in overcoming the conditions and terrains encountered. As such, some gear reduction units are adapted to permit the vehicle operator to shift from the four-wheel low-range drive mode into the four-wheel high-range drive mode without stopping the vehicle. For example, U.S. Pat. No. 5,054,335 discloses a transfer case equipped with a synchronized range shift arrangement for "on-the-move" shifting of a layshaft-type gear reduction unit. Alternatively, commonly-owned U.S. Pat. No. 5,346,442 discloses a transfer case having a synchronized range shift arrangement for on-the-move shifting of a planetary-type gear reduction unit. Finally, U.S. Pat. Nos. 4,569,252, 5,651,749, 5,655,986, 5,697,861 and 5,704,867 disclose transfer cases equipped with planetary-type gear reduction units which permits synchronized shifting between the high-range and low-range drive modes.

SUMMARY OF THE INVENTION

It is therefore an object of the present invention to provide a transfer case for a four-wheel drive vehicle having a planetary gear assembly and a range shift mechanism which can be selectively actuated for establishing a four-wheel high-range drive mode, a neutral mode, and a four-wheel low-range drive mode.

As a related object of the present invention, the range shift mechanism includes speed synchronizers for permitting "on-the-move" shifting of the transfer case between the four-wheel high-range and low-range drive modes.

According to another object of the present invention, the planetary gear assembly functions with reduced pinion noise and speed while generating less friction, as compared to conventional two-speed planetary gear arrangements, when the transfer case is operating in its high-range drive mode.

According to a preferred embodiment of the present invention, the planetary gear assembly is operably installed between an input shaft and an output shaft and includes a ring gear, a sun gear, and a pinion gear meshed with the ring gear and sun gear and which is rotatably supported from a planet carrier fixed to the output shaft. The range shift mechanism includes a range clutch having a first sleeve rotatably supported from a second sleeve which is driven by the input shaft. The range clutch is operable in first and second positions to respectively establish first and second drive connections between the input shaft and the output shaft. To establish the first drive connection, the first sleeve of the range clutch uncouples the ring gear from a stationary member and the second sleeve of the range clutch couples the input shaft to the planet carrier, whereby the output shaft is driven by the input shaft at a first speed ratio to define a high-range drive mode. To establish the second drive connection, the first sleeve of the range clutch couples the ring gear to the stationary member and the second sleeve couples the input shaft to the sun gear, whereby the output shaft is driven by the input shaft at a second speed ratio to define a low-range drive mode. The range clutch is further operable in a third position whereat the second sleeve is uncoupled from the sun gear and the planet carrier for establishing a Neutral non-driven mode.

As a further option, the range shift mechanism includes a first synchronizer that is operable for synchronizing the rotary speed of the planet carrier to that of the input shaft in response to movement of the range clutch from its third position toward its first position. In addition, the range shift mechanism includes a second synchronizer that is operable for braking rotation of the ring gear, and a third synchronizer that is operable for synchronizing the rotary speed of the sun gear to that of the input shaft in response to movement of the range clutch from its third position to its second position.

Additional objects, features and advantages of the present invention will become apparent from studying the following detailed description and appended claims when taken in conjunction with the accompanying drawings.

BRIEF DESCRIPTION OF THE DRAWINGS

FIG. 6 is a partial schematic illustration of the transfer case equipped with a transfer clutch.

FIG. 7 is a partial schematic illustration of the transfer case equipped with a mechanically actuated transfer clutch.

DETAILED DESCRIPTION OF THE PREFERRED EMBODIMENTS

In general, the present invention relates to a planetary gear assembly and a synchronized range shift mechanism installed in a transfer case of the type used in the drivetrain of a four-wheel drive vehicle and which permit "on-the-move" shifting of the transfer case between a low-range drive mode and a high-range drive mode during motive operation of the motor vehicle.

Figure 1:
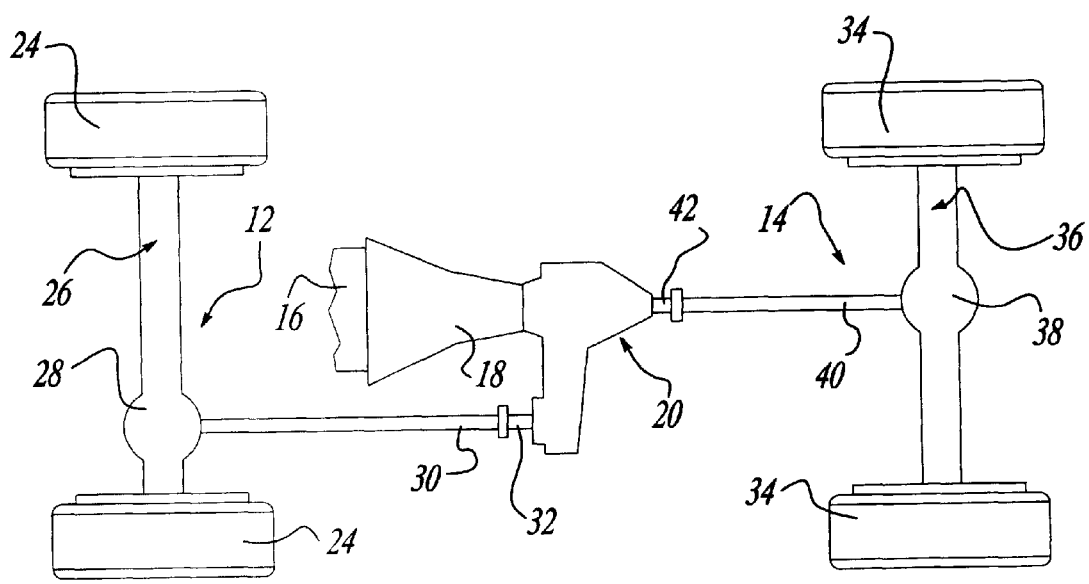
FIG. 1 illustrates the drivetrain of a four-wheel drive motor vehicle equipped with the transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

Transfer case 20 includes an input shaft 44 rotatably supported by a bearing assembly 46 from a housing 48. Input shaft 44 is adapted for connection to an output shaft (not shown) of transmission 18 such that both are rotatably driven by engine 16 of the motor vehicle. Rear output shaft 42 is rotatably supported between input shaft 44 and housing 48 by bearing assemblies 50 and 52. Likewise, front output shaft 32 is rotatably supported from housing 48 by bearing assemblies 54 and 56. Transfer case 20 is also shown to include a planetary gear assembly 60 which is operably installed between input shaft 44 and rear output shaft 42. Planetary gear assembly 60 includes a ring gear 62, a sun gear 64, and a set of pinion gears 66 which are each rotatably supported on a pinion shaft 68 and meshed with sun gear 64 and ring gear 62. Each pinion shaft 68 extends between a front carrier ring 70 and a rear carrier ring 72 which are interconnected to define a carrier assembly 74. Sun gear 64 is fixed to, or formed integrally with, a tubular quill shaft 76 which is supported by bearings 78 on rear output shaft 42. Rear carrier ring 72 is fixed (i.e., splined) to rear output shaft 42 such that driven rotation of carrier assembly 74 causes concurrent rotation of rear output shaft 42.

Planetary gear assembly 60 functions as a two-speed gear reduction unit which, in conjunction with a range clutch 82 of a synchronized range shift mechanism 84, is operable to establish either of a first or second drive connection between input shaft 44 and carrier assembly 74. To establish the first drive connection, carrier assembly 74 is coupled by range clutch 82 for common rotation with input shaft 44, thereby defining a high-range drive mode between input shaft 44 and rear output shaft 42. Likewise, the second drive connection is established by range clutch 82 initially coupling ring gear 62 to housing 48 and subsequently coupling sun gear 64 for rotation with input shaft 44. The second drive connection defines a low-range drive mode in which rear output shaft 42 is driven at a reduced speed in response to driven rotation of input shaft 44. A Neutral mode is established when range clutch 82 uncouples input shaft 44 from both carrier assembly 74 and sun gear 64. As will be detailed, synchronized range shift mechanism 84 is operable for permitting transfer case 20 to be shifted "on-the-move" between its high-range and low-range drive modes.

Range clutch 82 is a clutch sleeve assembly having a first or outer sleeve 86 rotatably mounted by bearing assembly 88 on a second or inner sleeve 90 and which is axially restrained thereon by a thrust washer 92 and a snap ring 94. Inner sleeve 90 has a first set of internal spline teeth 96 that are in constant mesh with external spline teeth 98 formed on a drive hub 100 fixed to, or integrally formed with, input shaft 44. Thus, inner sleeve 90 is mounted for rotation with drive hub 100 and axial sliding movement thereon such that driven rotation of input shaft 44 causes concurrent rotation of inner sleeve 90. Inner sleeve 90 is shown to also include a second set of internal spline teeth 102 which are offset axially from the first set of internal spline teeth 96.

Range shift mechanism 84 is further shown to include an annular hub 104 fixed to, or formed integral with, ring gear 62 and which has external spline teeth 106 formed thereon. As best seen from FIG. 4, hub 104 includes a series of circumferentially-spaced slots 108. Radial lugs 110 interconnecting an outer ring segment 112 and an inner ring segment 114 of outer sleeve 86 are retained in slots 108. In addition, internal spline teeth 116 on outer ring segment 112 are in constant mesh with external spline teeth 106 on hub 104. As such, outer sleeve 86 is mounted on hub 104 for rotation with ring gear 62 and for axial movement relative to hub 104. Thrust washers 118 and a snap ring 120 axially restrain ring gear 62 relative to housing 48. Preferably, ring gear 62 is a self-centering (i.e., "floating") gear component that is able to rotate relative to housing 48. Alternatively, ring gear 62 can be supported by a suitable bearing assembly for rotation relative to housing 48.

Range shift mechanism 84 also includes a neutral hub 128 which is rotatably supported by a bearing assembly 130 on quill shaft 76 and a first synchronizer assembly operably located between neutral hub 128 and front carrier ring 70 of carrier assembly 74. Neutral hub 128 has external spline teeth 132 formed thereon and front carrier ring 70 has external clutch teeth 134 formed thereon. First synchronizer assembly 126 is operable for causing speed synchronization between input shaft 44 and carrier assembly 74 in response to movement of range clutch 82 from a neutral position (denoted by position line "N") toward a high-range position (denoted by position line "H"). With range clutch 82 in its N position, inner sleeve 90 is positioned such that its first set of spline teeth 96 are meshed with spline teeth 98 on drive hub 100 and its second set of spline teeth 102 are meshed with spline teeth 132 on neutral hub 128. In addition, spline teeth 116 on outer sleeve 86 are only meshed with spline teeth 106 on hub 104. Once the speed synchronization process is completed, spline teeth 102 on inner sleeve 90 are permitted to move through the teeth of a blocker ring 136 and into meshed engagement with clutch teeth 134 on front carrier ring 70. Accordingly, with range clutch 82 positioned in its H position, inner sleeve 90 couples drive hub 100 to front carrier ring 70 such that carrier assembly 74 is coupled to rotate at the same speed as input shaft 44 for establishing the first drive connection therebetween. As noted, when the first drive connection is established, rear output shaft 42 is driven at a direct speed ratio relative to input shaft 42 to define the high-range drive mode.

Range clutch 82 further includes a second synchronizer assembly 142 and a third synchronizer assembly 144. Second synchronizer assembly 142 is operably disposed between outer ring segment 112 of outer sleeve 86 and a brake plate 146 which is fixed to housing 48. Second synchronizer assembly 142 includes a blocker ring 148 having lugs retained in slots formed in brake plate 146 for inhibiting rotation but permitting axial movement relative thereto. Second synchronizer assembly 142 also includes an energizing spring 150 which is disposed in circumferential grooves formed in brake plate 146 and blocker ring 148. Blocker ring 148 has an outer conical surface 152 engageable with an inner conical surface 154 formed on outer ring segment 112 of outer sleeve 86. Second synchronizer assembly 142 is operable to cause speed synchronization between outer sleeve 86 and brake plate 146 in response to movement of range clutch 82 from its N position toward a low-range position (denoted by position line "L"), thereby stopping (i.e., braking) rotation of outer sleeve 86, hub 104, and ring gear 62. Once speed synchronization is complete, spline teeth 116 on outer sleeve 86 move into meshed engagement with clutch teeth 156 on brake plate 146.

Third synchronizer assembly 144 is operably disposed between neutral hub 128 and a clutch plate 158 fixed to, or integrally formed with, quill shaft 76 and which has external clutch teeth 160 formed thereon. Third synchronizer assembly 144 is operable for causing speed synchronization between sun gear 64 and input shaft 44 in response to movement of range clutch 82 from its N position toward its L position. Once speed synchronization is complete, spline teeth 102 of inner sleeve 90 are permitted to move through the teeth of a blocker ring 162 and into meshed engagement with clutch teeth 160 on clutch plate 158. Accordingly, movement of range clutch 82 from its N position toward its L position causes outer sleeve 86 to couple ring gear 62 to brake plate 146 in addition to causing inner sleeve 90 to couple sun gear 64 to drive hub 98. Preferably, synchronizer assemblies 142 and 144 work in conjunction with range clutch 82 to brake rotation of ring gear 62 prior to coupling sun gear 64 for rotation with input shaft 44. With range clutch 82 positioned in its L position, sun gear 64 drives pinion gears 66 about stationary ring gear 62 such that carrier assembly 74 and rear output shaft 42 are driven at a reduced speed ratio relative to input shaft 44, thereby establishing the second drive connection and the low-range drive mode.

Range clutch 82 is shown in its N position whereat spline teeth 102 on inner sleeve 90 are released from engagement with clutch teeth 134 on carrier ring 70 and clutch teeth 160 on clutch plate 158 and yet are engaged with spline teeth 132 on neutral hub 128. As such, driven rotation of input shaft 44 causes rotation of inner sleeve 90 and neutral hub 128 which, as noted, is rotatably supported on quill shaft 76. Since inner sleeve 90 does not couple drive hub 100 to either of carrier ring 70 or clutch plate 158 when range clutch 82 is in its N position, no drive torque is transferred through carrier assembly 74 to rear output shaft 42, thereby establishing the Neutral non-driven mode.

Referring again to FIG. 2, transfer case 20 is shown to include a transfer assembly for selectively transferring drive torque from rear output shaft 42 to front output shaft 32. The transfer assembly includes a drive sprocket 164 rotatably supported on rear output shaft 42, a driven sprocket 166 fixed to front output shaft 32, and a continuous chain 168 interconnecting driven sprocket 166 to drive sprocket 164. To provide means for selectively establishing a drive connection between rear output shaft 42 and front output shaft 32, transfer case 20 is shown to include a mode shift mechanism 170. Mode shift mechanism 170 includes a mode clutch 172 which is operable to couple drive sprocket 164 to rear output shaft 42 for establishing a part-time four-wheel drive mode in which front output shaft 32 is rigidly coupled for rotation with rear output shaft 42. In addition, mode clutch 172 is operable for selectively uncoupling drive sprocket 164 from rear output shaft 42 for establishing a two-wheel drive mode in which all drive torque is delivered to rear output shaft 42. Mode clutch 172 includes a driven hub 174 fixed to rear output shaft 42 and having external spline teeth 176, a clutch plate 178 fixed to drive sprocket 164 having external clutch teeth 180 formed thereon, and a mode sleeve 182 having a set of internal spline teeth 184 which are in constant mesh with external spline teeth 176 of driven hub 174 such that mode sleeve 182 can be slid axially relative thereto.

Figure 2:
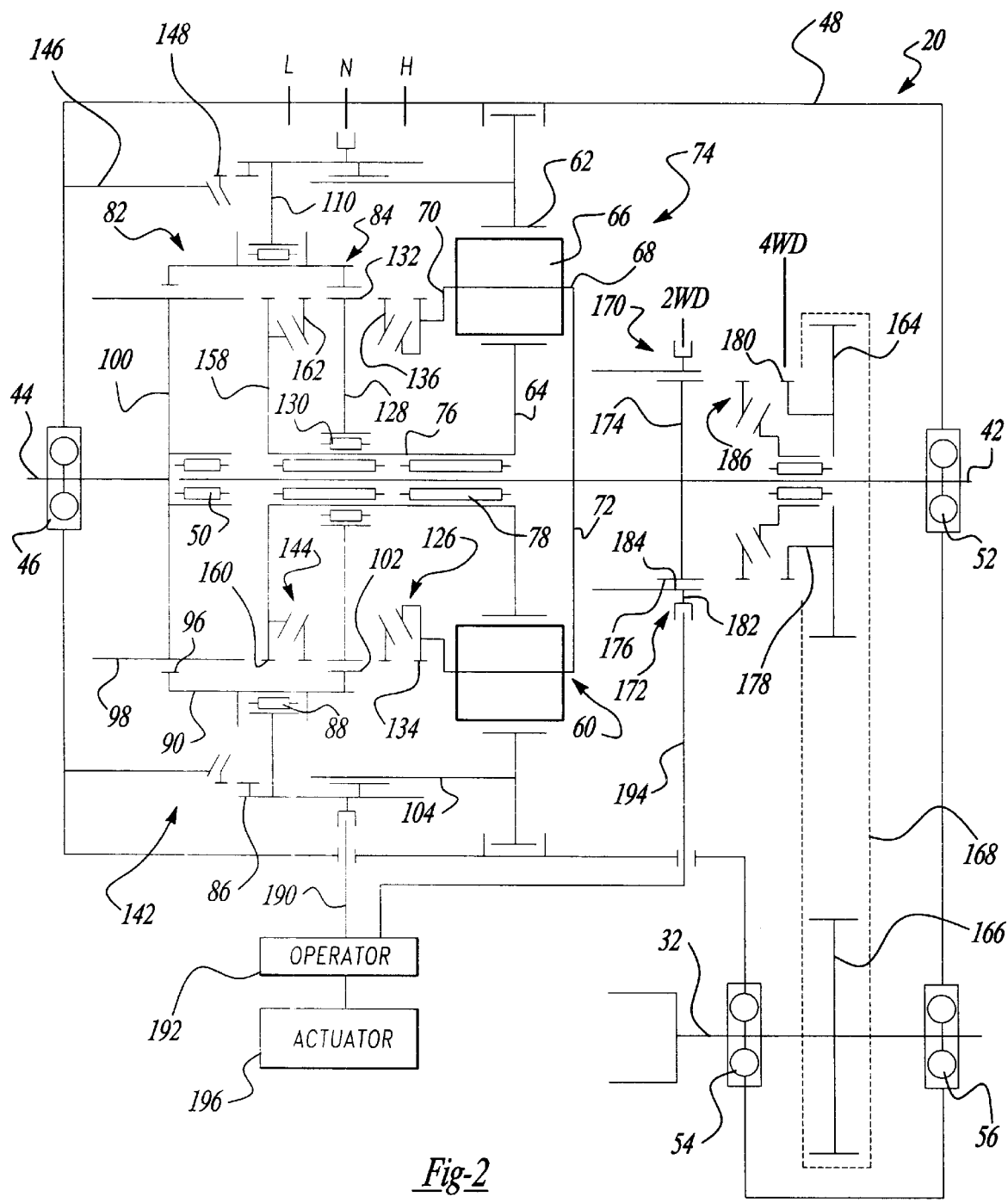
FIG. 2 is a schematic drawing of a transfer case equipped with a planetary gear assembly and a synchronized range shift mechanism according to the present invention.
Figure 3:
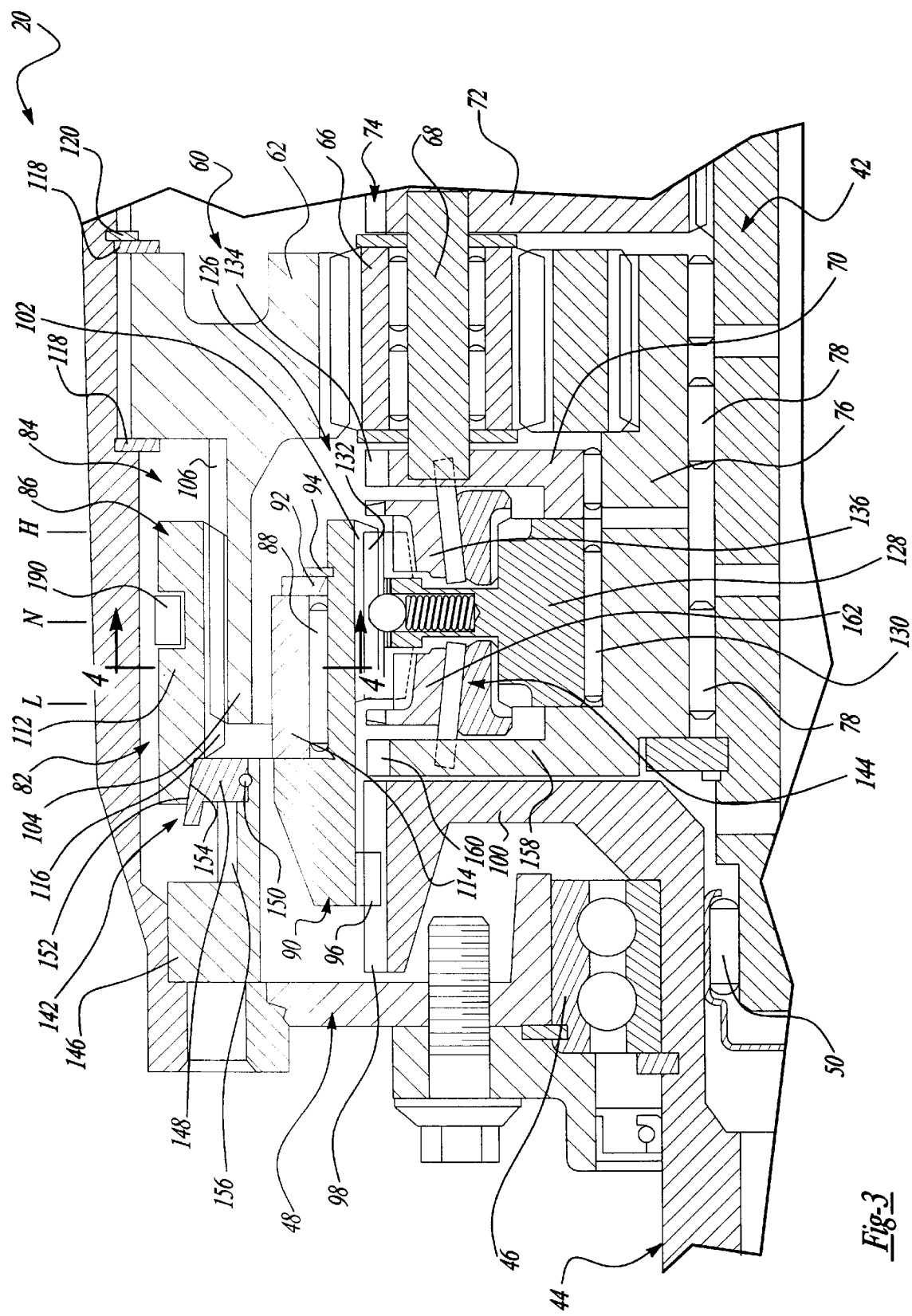
FIG. 3 is a partial sectional view of the planetary gear assembly and the synchronized range shift mechanism shown in FIG. 2.

In FIG. 2, mode sleeve 182 is shown in a first or two-wheel drive mode position (denoted by position line "2WD") whereat its spline teeth 184 are disengaged from clutch teeth 180 on clutch plate 178. In this mode position, drive sprocket 164 is uncoupled from rear output shaft 42 such that driven rotation of carrier assembly 74 causes all drive torque to be transmitted to rear output shaft 42, thereby establishing the two-wheel drive mode. Rearward axial movement of mode sleeve 182 from its 2WD position to a second or four-wheel drive mode position (denoted by position line "4WD") maintains engagement of mode sleeve spline teeth 184 with drive hub spline teeth 176 and causes mode sleeve spline teeth 184 to also engage clutch teeth 180 on clutch plate 178. In this mode position, relative rotation is prevented between rear output shaft 42 and front output shaft 32, thereby establishing the part-time four-wheel drive mode. Mode shift mechanism 170 is shown equipped with a synchronizer assembly 186 between driven hub 174 and clutch plate 178 for permitting on-the-fly shifting of mode sleeve 182 between its 4WD and 2WD mode positions in those vehicle applications where front driveline 12 is equipped with an axle disconnect mechanism. In particular, this arrangement permits front wheels 24 to be disconnected from the remainder of axle assembly 26 via the use of conventional vacuum-actuated locking hubs or an axle-shaft disconnect system when transfer case 20 is shifted into the two-wheel drive mode.

Referring still to FIG. 2, the shift system associated with transfer case 20 is shown to include a range fork 190 coupling range clutch 82 to an actuator 192, a mode fork 194 coupling mode sleeve 182 to actuator 192, and an operator 196 for controlling selective actuation of actuator 192. Actuator 192 can be any suitable device that is operable to cause coordinated axial movement of range clutch 82 and mode sleeve 182 in response to a particular drive mode selected by the vehicle operator via manipulation of operator 196. Alternatively, actuator 192 can be a pair of devices separately connected to each shift fork. Preferably, actuator 192 is a rotatable sector plate having range and mode camming arrangements for coordinated axial movement of shift forks 190 and 194 in a manner generally similar to that described in commonly owned U.S. Pat. No. 5,076,112. Additionally, operator 196 can be any suitable manually-actuated (i.e., a linkage coupling actuator 192 to a gearshift lever) or power-actuated (i.e., a gearmotor connected to actuator 192 and controlled by electric control signals from push-buttons or rotary switches) arrangement under the control of the vehicle operator for controlling actuation of actuator 192.

Figures 4, 5:
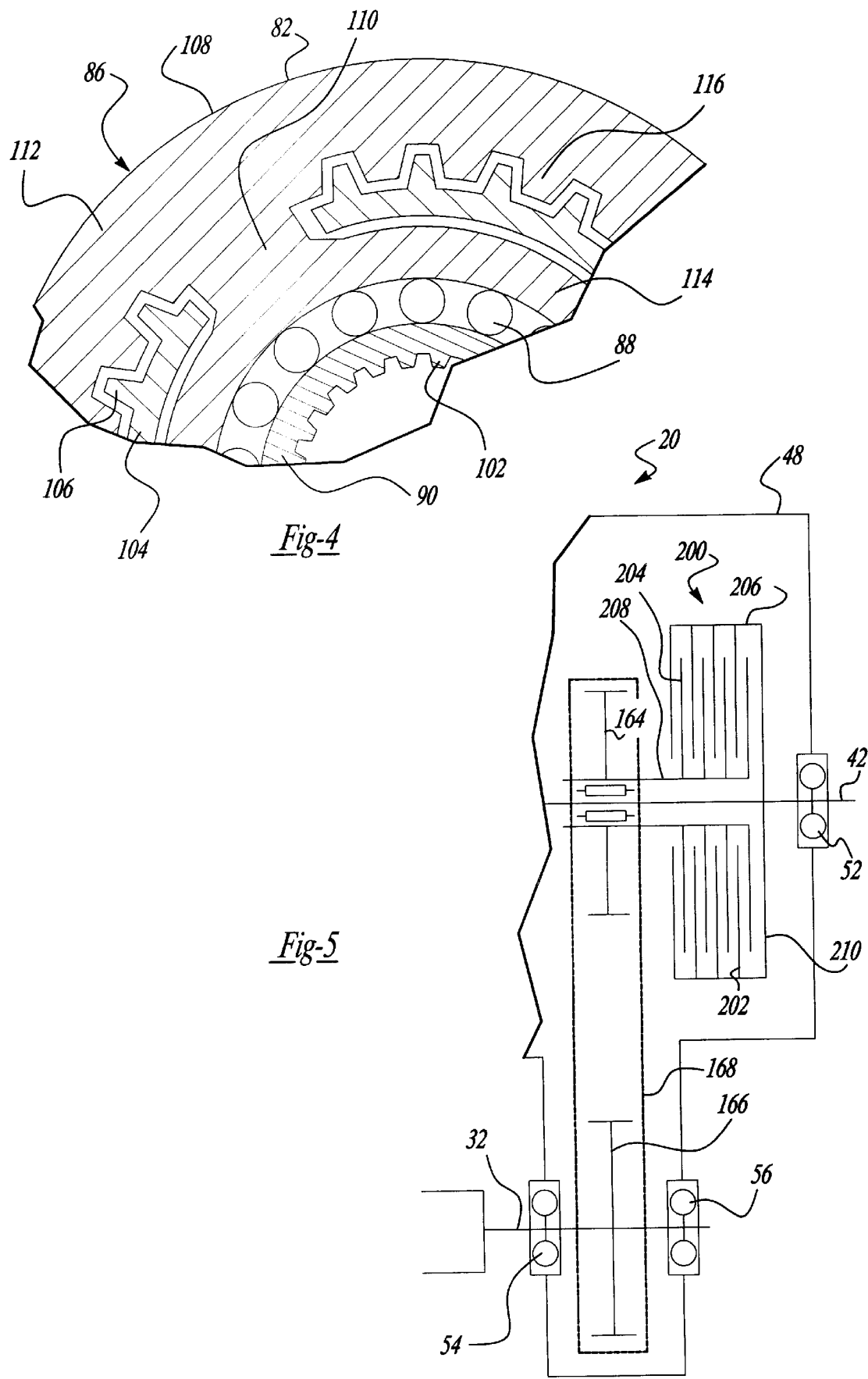
FIG. 4 is a partial sectional view taken generally along line 4—4 of FIG. 3.
FIG. 5 is a partial schematic illustration of the transfer case equipped with a transfer clutch.

Referring to FIG. 5, transfer case 20A is now shown to be equipped with a transfer clutch 200 in place of mode clutch 172. Transfer clutch 200 controls the transfer of drive torque to front output shaft 32 in response to speed differentiation between front and rear output shafts 32 and 42, respectively. In this regard, transfer clutch 200 is normally operable for permitting a limited amount of speed differentiation between front output shaft 32 and rear output shaft 42, whereby transfer case 20A is operating in its two-wheel drive mode. Transfer clutch 200 is further operable for establishing an "on-demand" four-wheel drive mode wherein drive torque is transferred to front output shaft 32 to prevent slip of rear output shaft 42. Transfer clutch 200 can progressively regulate the torque bias and speed differentiation automatically in response to, and as a function of, the amount of relative rotation between front output shaft 32 and rear output shaft 42. The torque versus slip characteristics of transfer clutch 200 can be tuned to meet specific vehicular applications.

Transfer clutch 200 includes a clutch pack having alternately interleaved clutch plates 202 and 204 mounted respectively for rotation with a drum 206 and a transfer shaft 208 fixed to, or integral with drive sprocket 164. Drum 206 includes a rear end plate 210 that is fixed to rear output shaft 42. A clutch engagement force operable for transferring torque through the clutch plates, can, for example, be generated in response to viscous shear (i.e., viscous couplings), hydraulic pressure (i.e., geared traction units) or in any other manner known in torque transfer devices. If desired, a mode shift mechanism similar to that previously described could be positioned between transfer shaft 208 and rear output shaft 42 for selectively preventing rotation therebetween and establishing the part-time four-wheel drive mode. Preferably, operator 196 is connected to the mode shift mechanism to permit selection of one of the on-demand or part-time four-wheel drive modes.

FIG. 6 illustrates a modified version of transfer case 20A shown in FIG. 5. In particular, transfer case 20B is now equipped with a transfer clutch 212 having a set of outer clutch plates 214 fixed to a drum assembly 216 which is fixed for rotation with drive sprocket 164, and a set of inner clutch plates 218 fixed for rotation with rear output shaft 42 and which are alternatively interleaved with outer clutch plates 214 to define a clutch pack. Transfer clutch 212 further includes a thrust mechanism 220 for exerting a clutch engagement force on the clutch pack and an actuator 222 for controlling the magnitude of the clutch engagement force as a function of the amount of interaxle slip. In particular, thrust mechanism 220 includes a piston 224 which is axially movable within a pressure chamber 226 of transfer clutch 212 for movement relative to the clutch pack. As shown, actuator 222 is a pump which supplies high pressure hydraulic fluid from a sump to pressure chamber 226 for controlling the axial position of piston 224 relative to the clutch pack and, as such, the clutch engagement force exerted thereon. Pump 222 can be a shaft driven device, such as a gerotor pump or a gear pump, in which the output pressure generated and supplied to pressure chamber 226 is proportional to the speed difference between front output shaft 32 and rear output shaft 42. With such a shaft-driven pump, the position of piston 224 in pressure chamber 226 and the clutch engagement force exerted on the clutch pack is progressive and is likewise generally proportional to the speed difference between output shafts 32 and 42. Alternatively, the output pressure generated by pump 222 can be adaptively controlled using a control system having a controller 230 which receives input signals from various vehicle sensors such as, for example, a rear speed sensor 232 and a front speed sensor 234. Controller 230 determines the real time value of the speed difference from the sensor signals supplied by speed sensors 232 and 234 and sends a control signal to pump 222 for regulating its output pressure as a function of the control signal. With either arrangement, valving can be used to tune the clutch engagement characteristic of piston 224 in chamber 226 and return springs can be used to return piston 224 to a released position relative to the clutch pack.

Controller 230 is programmed to control actuation of transfer clutch 212. Pursuant to an ON/Off on-demand control scheme, transfer clutch 212 is normally maintained in an non-actuated state to permit speed differentiation between front and rear output shafts 32 and 42, respectively. In this state, transfer case 20B is operating in its two-wheel drive mode. However, when the sensor input signals indicate a vehicular condition exceeding a predetermined value, transfer clutch 212 is fully actuated for "locking" front and rear output shafts 32 and 42 against relative rotation whereby they are, in effect, rigidly coupled for establishing the part-time four-wheel drive mode. As noted, the vehicular condition preferably used for controlling actuation of transfer clutch 212 is related to the speed differential between front output shaft 32 and rear output shaft 42. Thereafter, transfer clutch 212 is returned to its non-actuated state when the sensor input signals indicate that the magnitude of the vehicular condition is less than a predetermined value. In the progressive systems, a mode lock-out clutch can be provided to selectively couple drum 216 to rear output shaft 42 to mechanically establish the part-time four-wheel drive mode.

Alternatively, controller 230 can be programmed in accordance with an ADAPTIVE control scheme to regulate the actuated condition of transfer clutch 212 between its non-actuated and fully-actuated limits for varying the magnitude of speed differentiation and drive torque transmitted as a function of the sensor input signals. In operation, transfer clutch 212 increases the amount of drive torque delivered to the slower turning output shaft while concurrently decreasing the drive torque delivered to the faster turning output shaft in an amount equal to the torque capacity of the clutch at a given actuated state. In either of the above-noted control schemes, control over actuation of transfer clutch 212 is automatic and does not require any act or mode selection on the part of the vehicle operator. Under both control schemes, the process of monitoring vehicle conditions and controlling clutch engagement is continuous and automatic. If transfer case 20 is equipped with the electrically-controlled hydraulic system, then operator 196 permits the vehicle driver to select between on-demand four-wheel high-range and low-range modes with automatic clutch control, part-time four-wheel high-range and low-range drive modes where transfer clutch 212 is maintained in a fully actuated state, and the Neutral mode.

FIG. 7 illustrates transfer case 20C equipped with a mechanically-actuated transfer clutch 240. In particular, transfer clutch 240 is an electronically-controlled clutch assembly operably disposed between front output shaft 32 and rear output shaft 42 to automatically control the magnitude of the speed differentiation and the on-demand torque transfer therebetween. Transfer clutch 240 has a thrust mechanism 242 for exerting a clutch engagement force on the clutch pack with an actuator 244 controlling the magnitude of the clutch engagement force as a function of the value of interaxle slip. In particular, thrust mechanism 242 includes a pivotable lever arm assembly 246. Again, controller 230 controls the frictional biasing applied by transfer clutch 240 in response to a control signal generated based on the value of the sensor input signals. Preferably, actuator 244 facilitates coordinated movement of range clutch 82 and lever arm assembly 246 to permit the vehicle operator to select, via actuation of operator 196, on-demand four-wheel high-range and low-range drive modes, a neutral mode, and part-time four-wheel high-range and low-range drive modes. In the on-demand four-wheel drive modes, transfer clutch 240 is controlled automatically under either of the ON/OFF or ADAPTIVE schemes. When one of the part-time four-wheel drive modes is selected, transfer clutch 240 is held in its fully-actuated state. The mode selections described above are made available with transfer clutch 240 by operator 196 supplying controller 230 with a signal indicating the particular mode selected.

Figure 8:
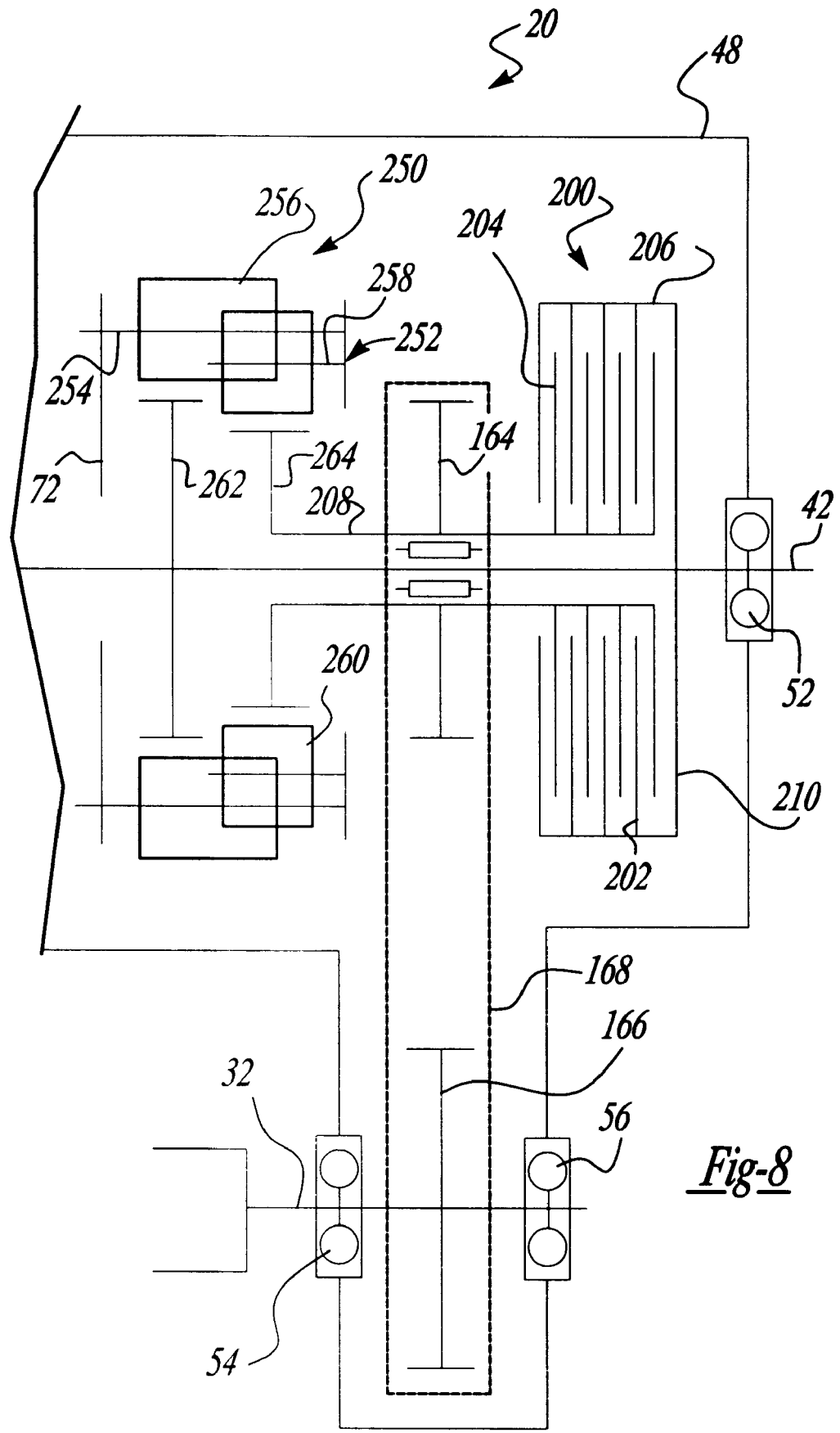
FIG. 8 is a partial schematic illustration of the transfer case equipped with an interaxle differential.

While the synchronized range shift arrangement of the present invention has been described in connection with part-time and on-demand transfer cases, those skilled in the art will appreciate that the arrangement can be used in virtually any type of transfer case where a two-speed shifton-the-move feature is required. For example, in full-time applications, rear carrier ring 72 would be fixed to the input member of an interaxle differential having outputs connected to rear output shaft 42 and front output shaft 32. Referring to FIG. 8, transfer case 20D is shown equipped with an interaxle differential 250 including a carrier 252 having long pinion shafts 254 on which long pinions 256 are rotatably supported and short pinion shafts 258 on which short pinions 260 are rotatably mounted. Long pinions 256 mesh with a second sun gear 262 fixed to rear output shaft 42 and short pinions 260 mesh with a third sun gear 264 fixed to transfer shaft 208. Pairs of long pinions 256 and short pinions 260 are meshed. Carrier 252 of differential 250 is fixed to rear carrier ring 72. In such full-time systems a passively or actively controlled transfer clutch, similar to those disclosed in FIGS. 5–7, could be arranged to limit speed differentiation and bias torque across differential 250 in response to slip between front output shaft 32 and rear output shaft 42. Finally, the advantages of lower pinion noise, lower pinion speed, and reduced friction provided by operation of the present invention in the high-range drive mode are still available in non-synchronized versions of the present invention in which first synchronizer assembly 126 and/or second and third synchronizer assemblies 142 and 144 are eliminated.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A planetary gear assembly comprising:
    a stationary member;
    a first rotary member;
    a second rotary member;
    a carrier coupled to said second rotary member;
    a ring gear;
    a sun gear;
    a pinion gear rotatably supported from said carrier and meshed with said ring gear and said sun gear;
    a range clutch having a first sleeve coupled for rotation with said ring gear and which is rotatably supported on a second sleeve coupled for rotation with said first rotary member, said range clutch is operable in a first position to uncouple said first sleeve from said stationary member and couple said second sleeve to said carrier such that said second rotary member is driven by said first rotary member at a first speed ratio, said range clutch is operable in a second position to couple said first sleeve to said stationary member and couple said second sleeve to said sun gear such that said second rotary member is driven by said first rotary member at a second speed ratio and said range clutch is operable in a third position whereat said first sleeve is uncoupled from said stationary member and said second sleeve is uncoupled from said carrier and said sun gear such that said second rotary member is not driven by said first rotary member; and
    a shift member for moving said range clutch between its first and second positions.

2. The planetary gear assembly of claim 1 wherein said stationary member is a housing, said first rotary member is an input shaft, and said second rotary member is an output shaft.

3. The planetary gear assembly of claim 1 further comprising a first synchronizer operable for synchronizing the rotary speed of said carrier to that of said first rotary member in response to movement of said range clutch to its first position.

4. The planetary gear assembly of claim 3 further comprising:
    a second synchronizer operable for synchronizing the rotary speed of said ring gear to that of said stationary member in response to movement of said range clutch to its second position; and
    a third synchronizer operable for synchronizing the rotary speed of said sun gear to that of said first rotary member in response to movement of said range clutch to its second position.

5. The planetary gear assembly of claim 4 wherein movement of said range crutch to its second position causes said second synchronizer to stop rotation of said ring gear and said first sleeve to engage said stationary member prior to causing said second sleeve to engage said sun gear.

6. The planetary gear assembly of claim 4 further comprising a drive hub fixed for rotation with said first rotary member, said second sleeve is fixed for rotation with said drive hub and sliding movement thereon in response to movement of said range clutch between its first and second positions, and a clutch plate fixed to said sun gear, wherein said first synchronizer is disposed between said drive hub and said carrier for inhibiting movement of said second sleeve into coupled engagement with said carrier until speed synchronization is established therebetween, and wherein said third synchronizer is disposed between said drive hub and said clutch plate for inhibiting movement of said second sleeve into coupled engagement with said clutch plate until speed synchronization is established therebetween.

7. The planetary gear assembly of claim 6 wherein said first sleeve is fixed for rotation with and axial movement on a hub extending from said ring gear, and wherein said second synchronizer is disposed between said hub and said stationary member for inhibiting movement of said first sleeve into coupled engagement with said stationary member until speed synchronization is established therebetween.

8. The planetary gear assembly of claim 6 further comprising a neutral hub rotatably supported on said second rotary member and located between said drive hub and said clutch plate, said second sleeve being fixed for rotation with said neutral hub and sliding movement thereon in response to movement of said range clutch between its first and second positions.

9. The planetary gear assembly of claim 8 wherein said first synchronizer is disposed between said neutral hub and said carrier and said third synchronizer is disposed between said neutral hub and said clutch plate.

10. A planetary gear assembly comprising:
    a stationary member;
    a first rotary member;
    a second rotary member;
    a carrier coupled to said second rotary member;
    a ring gear;
    a sun gear;
    a pinion gear rotatably supported from said carrier and meshed with said ring gear and said sun gear;
    a range clutch having a first sleeve coupled for rotation with said ring gear and which is rotatable supported on a second sleeve coupled for rotation with said first rotary member, said range clutch is operable in a first position to uncouple said first sleeve from said stationary member and couple said second sleeve to said carrier such that said second rotary member is driven by said first rotary member at a first speed ratio, said range clutch is operable in a second position to couple said first sleeve to said stationary member and couple said second sleeve to said sun gear such that said second rotary member is driven by said first rotary member at a second speed ratio;

a shift member for moving said range clutch between its first and second positions; and wherein movement of said range clutch to its second position causes said first sleeve to couple said ring gear to said stationary member prior to causing said second sleeve to couple said first rotary member to said sun gear.

11. A planetary gear assembly comprising:

a stationary member;

a first rotary member;

a second rotary member;

a carrier coupled to said second rotary member;

a ring gear;

a sun gear;

a pinion gear rotatably supported from said carrier and meshed with said ring gear and said sun gear;

a range clutch having a first sleeve coupled for rotation with said ring gear and which is rotatably supported on a second sleeve coupled for rotation with said first rotary member, said range clutch is operable in a first position to uncouple said first sleeve from said stationary member and couple said second sleeve to said carrier such that said second rotary member is driven by said first rotary member at a first speed ratio, and said range clutch is operable in a second position to couple said first sleeve to said stationary member and couple said second sleeve to said sun gear such that said second rotary member is driven by said first rotary member at a second speed ratio;

a first synchronizer operable for synchronizing the rotary speed of said carrier to that of said first rotary member in response to movement of said range clutch to its first position;

a second synchronizer operable for synchronizing the rotary speed of said ring gear to that of said stationary member in response to movement of said range clutch to its second position; and a third synchronizer operable for synchronizing the rotary speed of said sun gear to that of said first rotary member in response to movement of said range clutch to its second position.

12. The planetary gear assembly of claim 11 wherein movement of said range clutch to its second position causes said second synchronizer to brake rotation of said ring gear and said first sleeve to engage said stationary member prior to causing said second sleeve to engage said sun gear.

13. The planetary gear assembly of claim 11 wherein said stationary member is a housing, said first rotary member is an input shaft, and said second rotary member is an output shaft.

14. The planetary gear assembly of claim 11 wherein said range clutch is operable in a third position whereat said first sleeve is uncoupled from said stationary member and said second sleeve is uncoupled from said carrier and said sun gear such that said second rotary member is not driven by said first rotary member.

15. The planetary gear assembly of claim 11 further comprising a drive hub fixed for rotation with said first rotary member, said second sleeve is supported for rotation with said drive hub and sliding movement thereon in response to movement of said range clutch between its first and second positions, and a clutch plate fixed to said sun gear, wherein said first synchronizer is disposed between said drive hub and said carrier for inhibiting movement of said second sleeve into coupled engagement with said carrier until speed synchronization is established therebetween, and wherein said third synchronizer is disposed between said drive hub and said clutch plate for inhibiting movement of said second sleeve into coupled engagement with said clutch plate until speed synchronization is established therebetween.

16. The planetary gear assembly of claim 15 wherein said first sleeve is supported for rotation with and axial movement on a hub extending from said ring gear, and wherein said second synchronizer is disposed between said hub and said stationary member for inhibiting movement of said first sleeve into coupled engagement with said stationary member until speed synchronization is established therebetween.

17. The planetary gear assembly of claim 15 further comprising a neutral hub rotatably supported on said second rotary member and located between said drive hub and said clutch plate, said second sleeve being fixed for rotation with said neutral hub and sliding movement thereon in response to movement of said range clutch between its first and second positions.

18. The planetary gear assembly of claim 17 wherein said first synchronizer is disposed between said neutral hub and said carrier and said third synchronizer is disposed between said neutral hub and said clutch plate.

19. A transfer case for use in a four-wheel drive vehicle, comprising:

a housing;

an input shaft rotatably supported from said housing;

an output shaft rotatably supported from said housing;

a planetary gear assembly including a ring gear, a sun gear, and a pinion gear meshed with said ring gear and said sun gear, said pinion gear is rotatably supported on a carrier coupled to said output shaft;

a range clutch having a first sleeve coupled for rotation with said ring gear and which is rotatably supported on a second sleeve coupled for rotation with said input shaft, said range clutch is operable in a first position to uncouple said first sleeve from said housing and to couple said second sleeve to said carrier such that said output shaft is driven by said input shaft at a first speed ratio, and said range clutch is operable in a second position to couple said first sleeve to said housing and to couple said second sleeve to said sun gear such that said output shaft is driven by said input shaft at a second speed ratio; and a shift member for moving said range clutch between its first and second positions;

wherein movement of said range clutch to its second position causes said first sleeve to engage said housing prior to causing said second sleeve to engage said sun gear.

20. The transfer case of claim 19 further comprising a first synchronizer operable for synchronizing the rotary speed of said carrier to that of said first input shaft in response to movement of said range clutch to its first position.

21. The transfer case of claim 19 further comprising:

a second output shaft rotatably supported from said housing; and a transfer assembly for transferring drive torque from said first output shaft to said second output shaft.

22. The transfer case of claim 21 wherein said transfer assembly includes a drive member rotatably supported on said first output shaft, a driven member fixed to said second output shaft, and a mechanism for interconnecting said driven member to said drive member.

23. The transfer case of claim 21 further comprising a mode clutch operable in a first mode to uncouple said transfer assembly from said first output shaft to establish a two-wheel drive mode, said mode clutch is operable in a second mode to couple said transfer assembly to said first output shaft to establish a four-wheel drive mode.

24. The transfer case of claim 21 further comprising a transfer clutch for automatically transferring drive torque from said first output shaft to said transfer assembly in response to excessive speed differentiation between said first and second output shafts to establish an on-demand four-wheel drive mode.

25. A transfer case for use in a four-wheel drive vehicle, comprising:

a housing;

an input shaft rotatable supported from said housing;

an output shaft rotatable supported from said housing;

a planetary gear assembly including a ring gear, a sun gear, and a pinion gear meshed with said ring gear and said sun gear, said pinion gear is rotatably supported on a carrier coupled to said output shaft;

a range clutch having a first sleeve coupled for rotation with said ring gear and which is rotatable supported on a second sleeve coupled for rotation with said input shaft, said range clutch is operable in a first position to uncouple said first sleeve from said housing and to couple said second sleeve to said carrier such that said output shaft is driven by said input shaft at a first speed ratio, and said range clutch is operable in a second position to coupled said first sleeve to said housing and to couple said second sleeve to said sun gear such that said output shaft is driven by said input shaft at a second speed ratio;

a shift member for moving said range clutch between its first and second positions;

a first synchronizer operable for synchronizing the rotary speed of said carrier to that of said first input shaft in response to movement of said range clutch to its first position;

a secondary synchronizer operable for synchronizing the rotary speed of said ring gear to that of said housing in response to movement of said range clutch to its second position; and a third synchronizer operable for synchronizing the rotary speed of said sun gear to that of said input shaft in response to movement of said range clutch to its second position.

26. The transfer case of claim 25 wherein movement of said range clutch to its second position causes said second synchronizer to stop rotation of said ring gear and said first sleeve to engage said housing prior to causing said second sleeve to engage said sun gear.

27. A transfer case for use in a four-wheel drive vehicle, comprising:

a housing;

an input shaft rotatable supported from said housing;

an output shaft rotatably supported from said housing;

a planetary gear assembly including a ring gear, a sun gear, and a pinion gear meshed with said ring gear and said sun gear, said pinion gear is rotatably supported on a carrier coupled to said output shaft;

a range clutch having a first sleeve coupled for rotation with said ring gear and which is rotatably supported on a second sleeve coupled for rotation with said input shaft, said range clutch is operable in a first position to uncouple said first sleeve from said housing and to couple said second sleeve to said carrier such that said output shaft is driven by said input shaft at a first speed ratio, and said range clutch is operable in a second position to coupled said first sleeve to said housing and to couple said second sleeve to said sun gear such that said output shaft is driven by said input shaft at a second speed ratio;

a shift member for moving said range clutch between its first and second positions;

a second output shaft rotatably supported from said housing;

a transfer assembly for transferring drive torque from said first output shaft to said second output shaft;

a transfer clutch for automatically transferring drive torque from said first output shaft to said transfer assembly in response to excessive speed differentiation between said first and second output shaft to establish an on-demand four-wheel drive mode; and wherein said transfer clutch has a clutch pack operably interconnected between said first output shaft and said transfer assembly, and means for generating a clutch engagement force exerted on said clutch pack.

* * * * *